United States Patent
Olson-Williams et al.

(10) Patent No.: US 6,185,588 B1
(45) Date of Patent: Feb. 6, 2001

(54) METHOD AND APPARATUS FOR PRINTING WORLDWIDE WEB PAGES IN ACCORDANCE WITH OPERATOR SELECTED FORMATTING

(75) Inventors: Lonny R. Olson-Williams, Rochester; Jay Peter Obey, Chatfield, both of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 08/777,866

(22) Filed: Dec. 31, 1996

(51) Int. Cl.[7] .................................................. G06F 17/21
(52) U.S. Cl. ........................................... 707/515; 707/513
(58) Field of Search ..................... 395/200.48, 200.75, 395/200.32; 707/10, 13, 15

(56) References Cited

U.S. PATENT DOCUMENTS

| | | | |
|---|---|---|---|
| 4,648,071 | 3/1987 | Repass | 707/537 |
| 5,572,643 | * 11/1996 | Judson | 395/200.48 |
| 5,761,436 | * 6/1998 | Nielsen | 395/200.75 |
| 5,793,964 | * 8/1998 | Rogers et al. | 395/200.32 |
| 5,813,007 | * 9/1998 | Nielsen | 707/10 |

OTHER PUBLICATIONS

Taylor, Conrad. "What has WYSIWYG done to us?" The Seybold Report on Publishing Systems. Sep. 30, 1995: 1–46.*

Momentum in the Publishing Community, PR Newswire. Sep. 10, 1996: pp. 1–7.*

Clickbook.Com, How it Works BookMaker Corporation Palo Alto, CA 94306 Jun. 14, 1996 www.clickbook.com/cowin.html.

PC Week: Printing Improvements in Store for Internet Explorer Microsoft Redmond, WA Oct. 8, 1996 www-.pcweek.com/news/0930/04.html.

\* cited by examiner

Primary Examiner—James P. Trammell
Assistant Examiner—John Leonard Young
(74) Attorney, Agent, or Firm—Felsman, Bradley, Vaden, Gunter & Dillon, LLP

(57) ABSTRACT

A method and apparatus prints copies of internet pages from the worldwide web, in accordance with operator-selected formatting instructions. A plurality of internet page record locators are selected and recorded in memory of the data processing system, preferably grouped in a directory such as a Bookmark, Favorite, or Hotlist directory. Operator-specified formatting instructions are then obtained. The formatting instructions may relate to attributes such as page headers, page footers, page break location, pagination, cover sheets, table of contents, the content allocation and placement among the printed pages, as well as the presence or absence of internet identification titles, and the presence or absence of visually perceptible internet links or internet icons from the Internet pages. Finally, the formatted internet pages are printed, utilizing the printer associated with the data processing system, in accordance with the particular operator-selected format requirements which are associated with the selected internet pages.

27 Claims, 11 Drawing Sheets

METHOD AND APPARATUS FOR PRINTING WORLDWIDE WEB PAGES IN ACCORDANCE WITH OPERATOR SELECTED FORMATTING

BACKGROUND OF THE INVENTION

1. Field of the Invention

The present invention relates in general to the utilization of data processing systems for generating printed materials, and in particular to the utilization of data processing systems for generating printed copies of worldwide web pages.

2. Description of the Prior Art

Commercial use of the worldwide web (www) is likely to increase considerably as greater numbers of computer users subscribe to on-ramp and other service providers. The web is now widely regarded as the most important new frontier in advertising and marketing, principally due to the beneficial integration of text and graphics available through the web, and to the emergence of relatively low cost web browser software and plug-in software that facilitate searching, retrieving, and sorting of web materials, including the text and graphics.

However, the web is not likely to supplant entirely the use of printed advertising, promotional, proposal, and sales materials. Presently, the web does not readily accommodate such a commercial reality. A few web sites dually maintain a postscript duplication of the HTML file for the purpose of allowing printing by web users. Additionally, a few plug-in modules provide high quality printing formats which facilitate the printing of the HTML files.

The principal problem with both of these prior art approaches is that each assumes that every user wants the same document in exactly the same format and with the same contents. Currently, using a web browser, it is possible to dynamically build a custom document whose table of contents is defined (depending upon the particular browser) by a hot list file, a quick list file, or a bookmark file, etc. This list of bookmarks may reference remote data on the internet or local data on a drive or other memory media. However, this approach has two significant disadvantages: (1) printing documents is currently quite time-consuming, (2) the finished printouts lack continuity from one page to the next page, and (3) the images and text of the internet pages may be broken or separated, rendering the printed document unprofessional looking.

SUMMARY OF THE INVENTION

It is one objective of the present invention to combine advantageously the beneficial integration of text and images available through the worldwide web with the powerful and commonly available web-browsers and other software, in order to facilitate the generation of printed ("hard copy") advertising, promotional, proposal, business, and sales documents.

It is another objective of the present invention to allow for the generation of such printed material without the lengthy delays associated with printing operations of the prior art, and without the pagination and format problems of the prior art.

These and other objectives are achieved as is now described. A method and apparatus is provided for generating printed copies of internet pages from the worldwide web, using a data processing system and an associated printer, in accordance with operator-selected formatting instructions. A plurality of internet page record locators are selected and recorded in memory of the data processing system. Preferably, the internet page record locators are grouped in a directory in a graphical user interface for the data processing system, such as the "Bookmark", "Favorite", and "Hotlist" functions currently available in the commercially available web browsers. A computer program is provided which receives operator input for selection for printing of particular internet pages, which are associated with corresponding particular ones of the plurality of internet page record locators. The data processing system is utilized for retrieving particular internet pages, utilizing the corresponding particular ones of the plurality of internet page record locators. The pages may be retrieved from the worldwide web, a local or wide area network, or the local memory media associated with the particular data processing system being utilized by the operator. Next, operator input is received for determining operator-selected format requirements. The format requirements may relate to any one of a number of predetermined print format attributes, such as page headers, page footers, page break location, pagination, cover sheets, table of contents, the content allocation and placement among the printed pages, as well as the presence or absence of internet identification titles, and the presence or absence of visually perceptible internet links or internet icons within the internet pages. Of course, any other conventional or novel format attribute can also be set or determined by the operator-selected format requirements. In the preferred embodiment of the present invention, the operator interacts with the data processing system in order to determine what particular format he or she desires for the particular printed pages. Finally, the formatted internet pages are printed, utilizing the printer associated with the data processing system, in accordance with the particular operator-selected format requirements which are associated with the selected internet pages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The method and apparatus of the present invention may be utilized in a distributed data processing system and/or in a personal computer. The distributed data processing system will be described with reference to FIG. 1, and the personal computer will be described with reference to FIG. 2.

Figure 1:
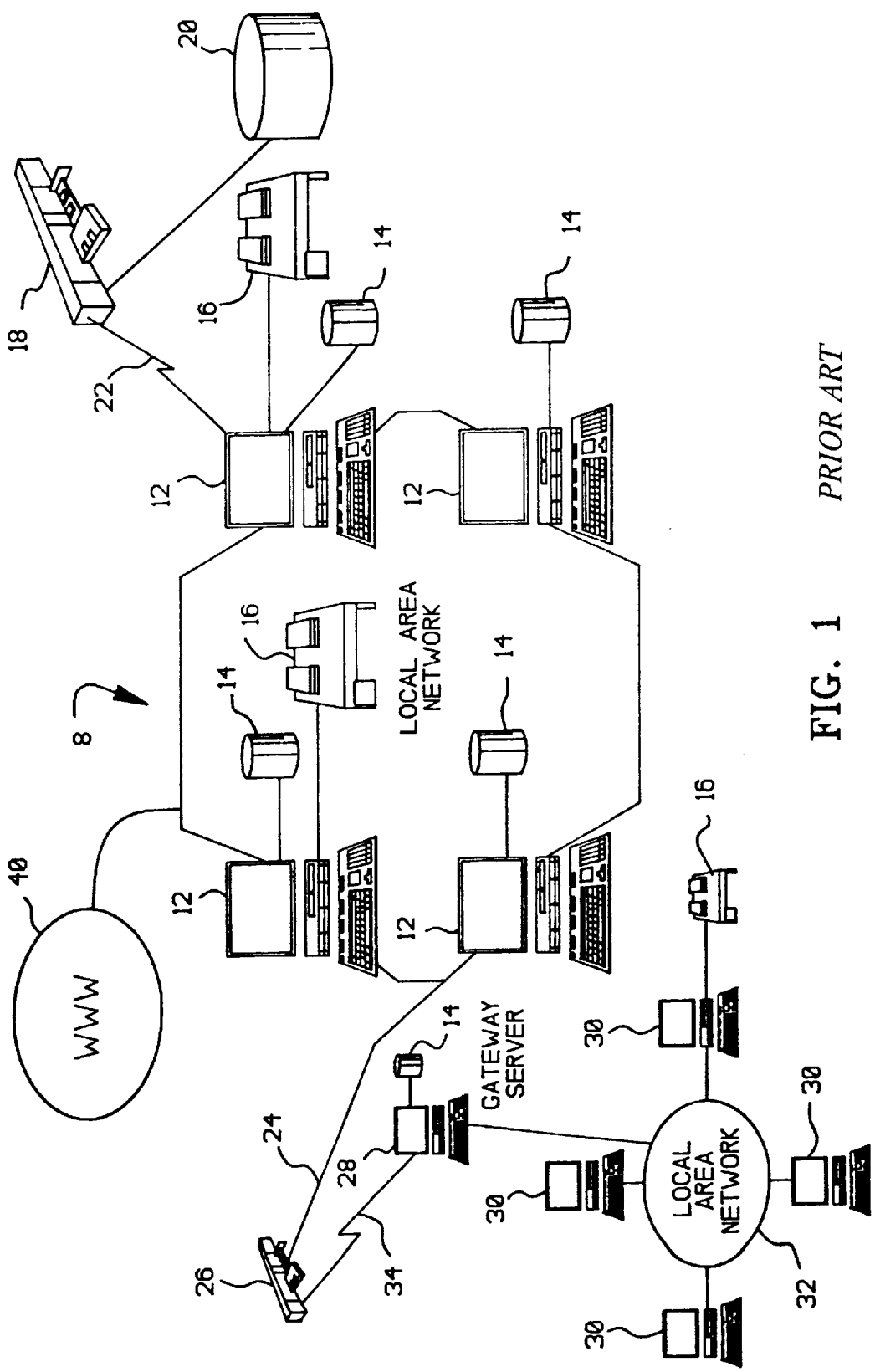
FIG. 1 is a pictorial representation of local and wide area networks area networks coupled to the worldwide web.

As is shown in FIG. 1, distributed data processing system 8 may include a plurality of networks, such as local area networks (LAN) 10 and 32, each of which preferably includes a plurality of individual computers 12, 30, respectively. Of course, those skilled in the art will appreciate that a plurality of intelligent work stations coupled to a host computer may be utilized for each such network. As is common in such distributed data processing systems, each individual computer may be coupled to a storage device 14 and/or a printer/output device 16, One or more such storage devices 14 may be utilized, in accordance with the method and system of the present invention, to store various "groupware" applications or documents which may be simultaneously or successively accessed and processed by multiple users. Furthermore, one or more systems may be included for managing data processing resources, including the groupware applications and documents, in accordance with conventional technologies.

Still referring to FIG. 1, it may be seen that distributed data processing network 8 may also include multiple mainframe computers, such as mainframe computer 18, which may be preferably coupled to local area network (LAN) 10 by means of communication link 22. Mainframe computer 18 may be coupled to a storage device 20 which may serve as remote storage for local area network (LAN) 10 and may be coupled via communications controller 26 and communications link 34 to a gateway server 28. Gateway server 28 is preferably an individual computer or intelligent work station (IWS) which serves to link local area network (LAN) 32 to local area network (LAN) 10.

As discussed above with respect to local area network (LAN) 32 and local area network (LAN) 10, a plurality of data objects, application programs, and data files, groupware programs, or groupware documents may be stored within storage device 20 and controlled by mainframe computer 18, as resource manager or library service for the data objects and documents thus stored. Those skilled in the art will appreciate that it is often desirable to permit simultaneous or successive, as well as restricted, access to such data objects, application programs, data files, groupware applications, or groupware documents to allow for the beneficial synergistic effects of group work. The distributed data processing system can be communicatively coupled to the worldwide web 40. Additionally, those skilled in the art will appreciate that mainframe computer 18 may be located a great geographical distance from local area network (LAN) 10; and, similarly, local area network (LAN) 10 may be located a substantial distance from local area network (LAN) 32. That is, local area network (LAN) may be located in California, while local area network (LAN) 10 may be located in Texas, and mainframe computer 18 may be located in New York.

Figure 2:
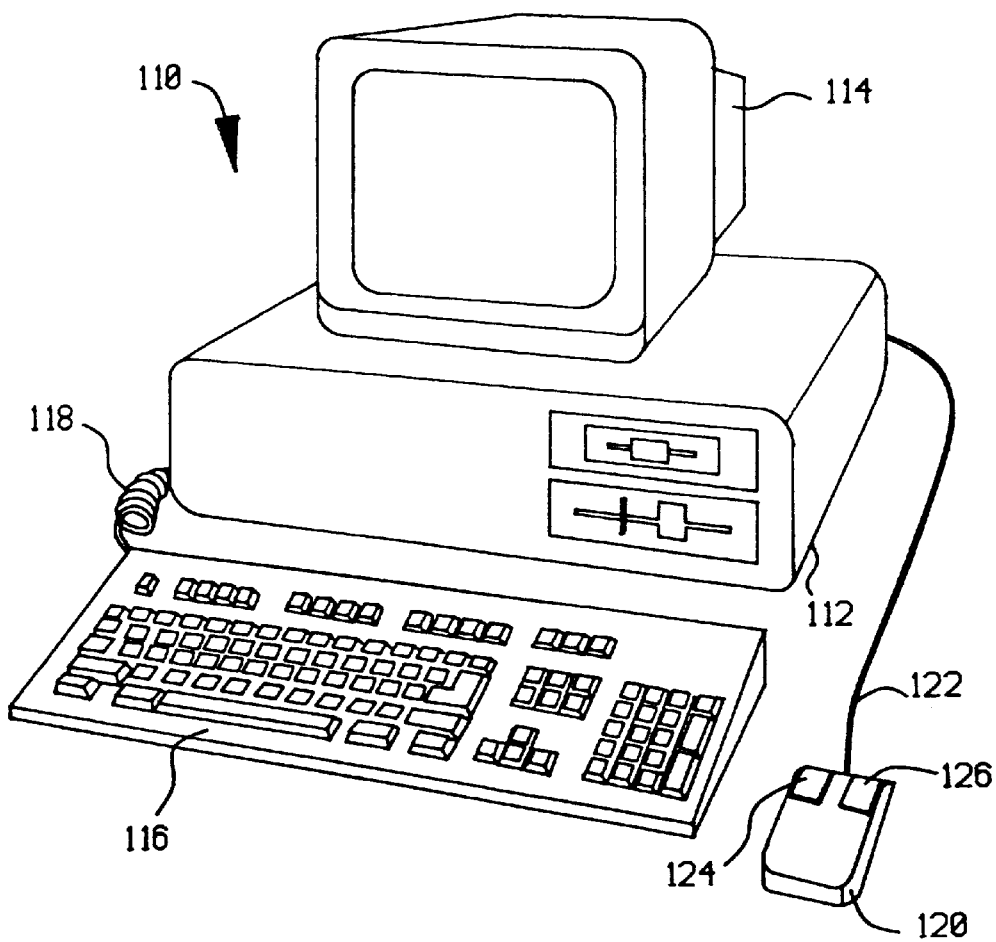
FIG. 2 is a pictorial representation of a personal computer which may be continuously or intermittently connected to the local area networks, wide area networks, and worldwide web of FIG. 1.

With reference now to the figures and in particular with reference to FIG. 2, there is depicted a pictorial representation of data processing system 110 which may be programmed in accordance with the present invention. As may be seen, data processing system 110 includes processor 112 which preferably includes a graphics processor, memory device and central processor (not shown). Coupled to processor 112 is video display 114 which may be implemented utilizing either a color or monochromatic monitor, in a manner well known in the art. Also coupled to processor 112 is keyboard 116. Keyboard 116 preferably comprises a standard computer keyboard which is coupled to the processor by means of cable 118.

Also coupled to processor 112 is a graphical pointing device, such as mouse 120. Mouse 120 is coupled to processor 112, in a manner well known in the art, via cable 122. As is shown, mouse 120 may include left button 124, and right button 126, each of which may be depressed, or "clicked", to provide command and control signals to data processing system 110. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 110 may be implemented utilizing a so-called personal computer, such as those manufactured by International Business Machines Corporation.

Figure 3:
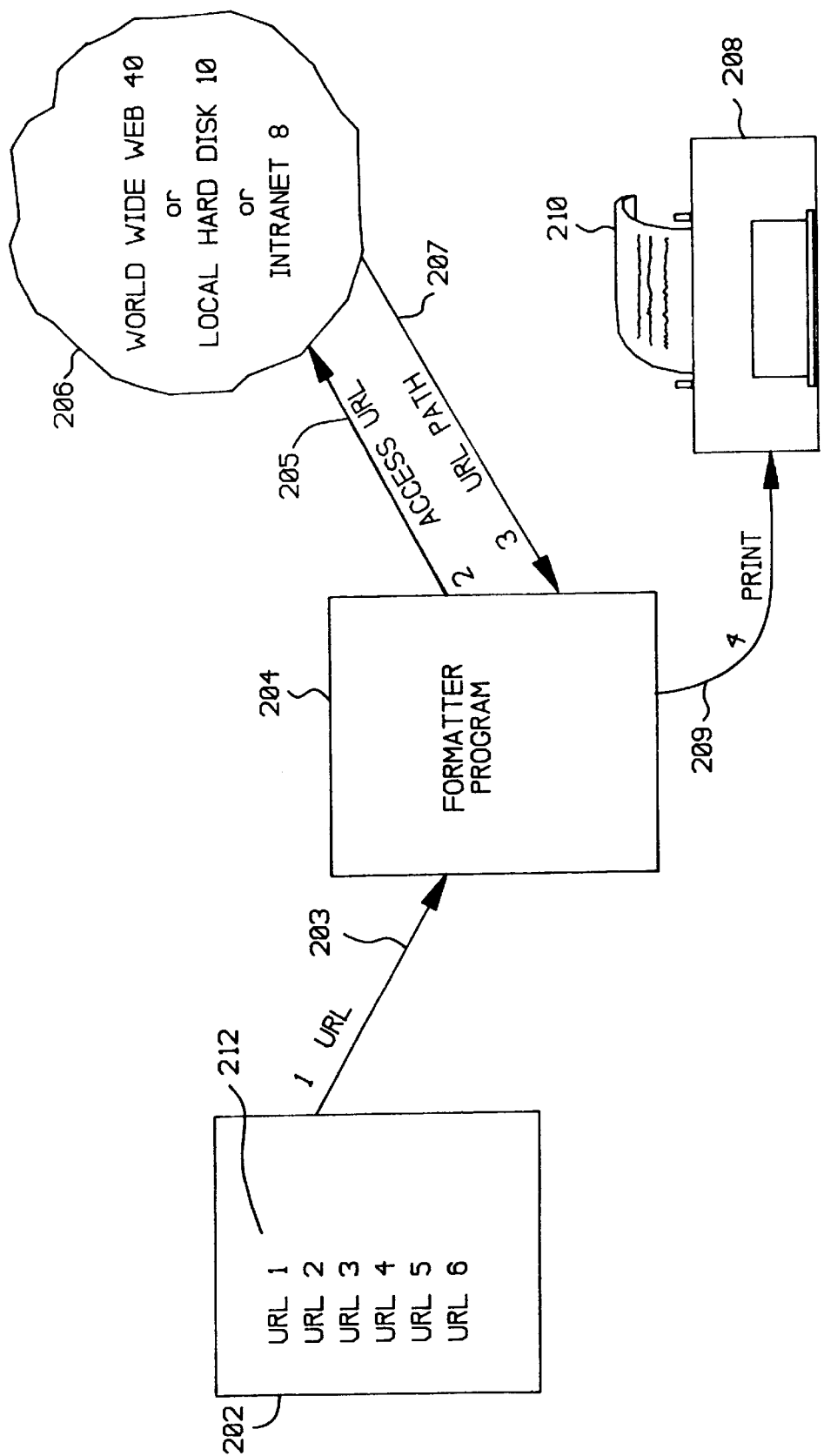
FIG. 3 is a block diagram and pictorial representation of the method and apparatus of the present invention in broad overview.

FIG. 3 is a block diagram and pictorial representation of the method and apparatus of the present invention for generating hard copy printouts of worldwide web pages, shown in broad overview. Graphical user interface directory file 202 is provided as a component of a graphical user interface in the data processing system 110 of FIG. 2. It includes a plurality of internet page record locators 212. In accordance with one particular embodiment of the present invention, the internet page record locators 212 may comprise universal record locators (URLs). URLs are commonly used through commercially available web browsers, and are utilized to allow internet users to assemble a directory of their favorite or most commonly used internet sites. Typically, the directory is visible in the graphical user interface of the web browser, and provides a graphical or iconographical representation of the particular web sites selected by the operator. The operator need only "click on" a particular one of the universal record locators, and the web browser will quickly and automatically access and display the particular web page or pages associated with the URL. The most popular web browser software packages utilize different names to describe the graphical user interface directory file 212. In the web browser distributed under the name INTERNET EXPLORER, the interface directory file is described as a "Favorites" file. In the browser software distributed under the registered trademark NETSCAPE, the interface directory file is identified as a "Bookmarks" file. In the browser software package distributed under the name MOSAIC, the interface directory file is identified as a "Hotlist" file. In accordance with the present invention, there is a software connection 203 between graphical user interface directory file 202 and the formatter program 204 of the present invention, which allows the user to utilize the listing of the graphical user interface directory file 202 as a directory of pages that are available for hard copy printout in accordance with the present invention. The formatter program 204 is communicatively connected through output link 205 and input link 207 to internet page source 206. Internet page source 206 may comprise the worldwide web 40, the hard disk or other memory media of data processing system 110, or any other memory media within any local area network, or wide area network, that data processing system 110 is communicatively connected to (which can be identified as "intranet sources 8"). The formatter program 204 of the present invention is adapted to receive operator input for selection for printing of particular internet pages which are associated with corresponding particular ones of the plurality of internet page record locators 212 of graphical user interface directory file 202. Formatter program 204 is also adapted to retrieve the particular internet pages utilizing the corresponding particular ones of the plurality of internet page record locators 212 from the internet page source 202. An example of the format and content of a universal record location is as follows: http://www.AS400.ibm.com. An example of a record locator that may be utilized on the hard disk or other memory media of data processing system 110 is as follows: File:///c:\windows\html\fancy.htm. Formatter program 204 is also utilized to receive the operator input for operator-selected format requirements. The operator-selected format requirements may constitute any format decision which would affect the appearance of the internet pages. This allows the operator to utilize internet pages to create printed materials, which may be utilized in any number of conventional business activities, such as generating sales, promotional, or proposal materials. As is shown, the formatter program 204 is connected through printing link 209 to printer 208. Printer 208 is utilized to print hard copies of the reformatted or altered internet pages. In accordance with the present invention, this process is repeated for all of the internet pages desired for printing.

Figure 4:
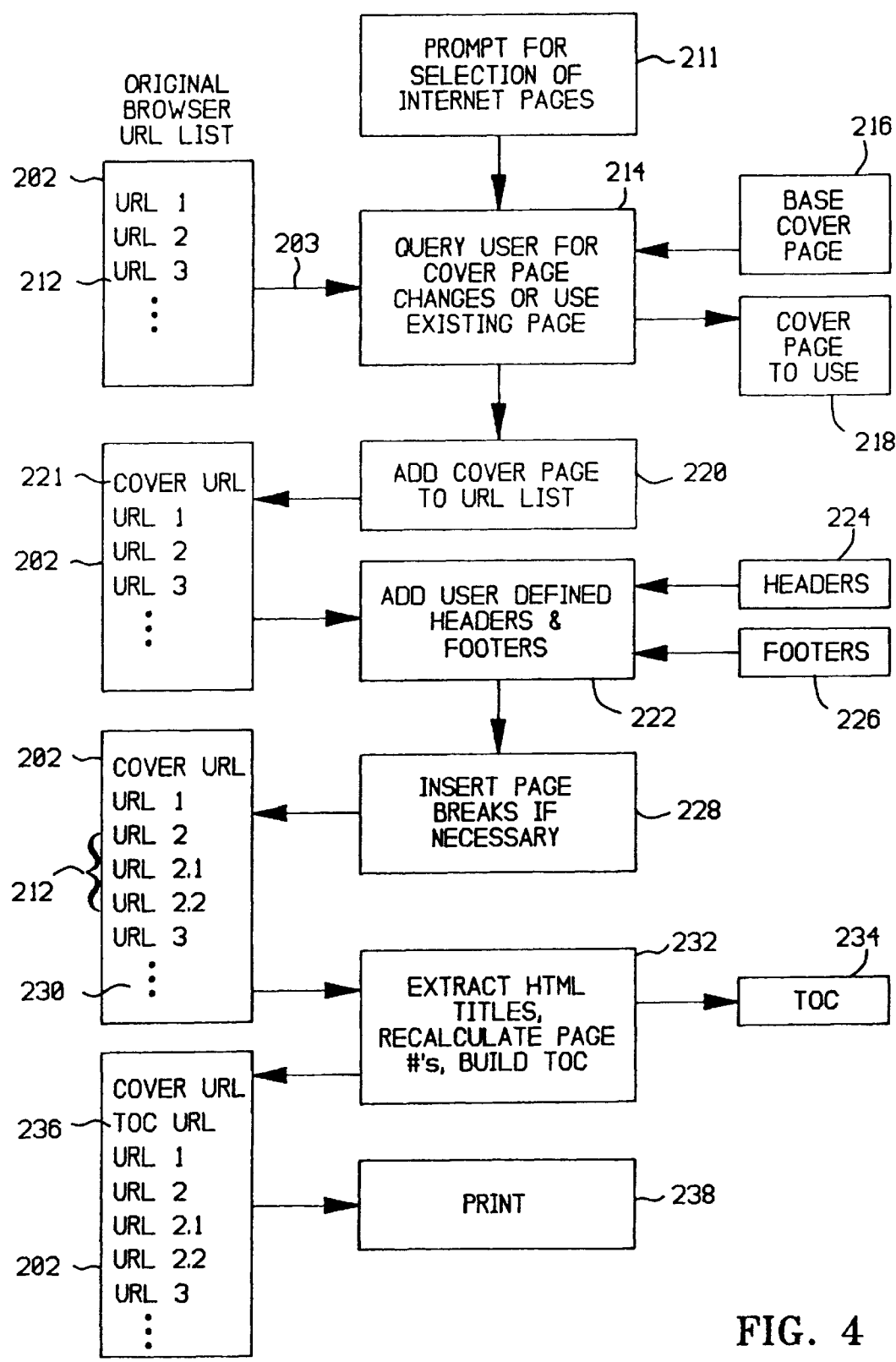
FIG. 4 is a pictorial and flowchart representation of the data processing implemented steps of formatting worldwide web pages in accordance with the present invention.

FIG. 4 is a block diagram and flowchart representation of the formatter program 204 of FIG. 3. The process begins at software block 211, wherein data processing system 110 prompts the operator for selection of internet pages desired for hard copy printing. In response to the prompt, the operator selects one or more of the internet page record locators 212 of the graphical user interface directory file 202. The record locators are communicated via communication link 203 to the formatter program 204. Next, in accordance with software block 214, the data processing system 110 prompts the operator for the selection or creation of a cover page. The operator may create his/her cover page from scratch or may utilize one or more exemplary cover pages which may be modified and then used. Software block 216 represents the one or more exemplary cover pages which are provided to the operator for review. Once the user has completed the task of creating or modifying the cover page, in accordance with software block 220, the cover page is added to the graphical user interface directory file 202. As is shown in FIG. 4, a brief text component is added to the graphical user interface directory file 202, such as text 221. The process continues in software block 222, wherein the operator is prompted to add user-defined headers and footers to the selected internet page. A library of headers 224 and a library of footers 226 are provided to the operator for use and modification. Then, in accordance with software block 228, the operator is prompted to insert any page breaks. The operator-determined page breaks are recorded in the graphical user interface directory file 202. For example, the group 212 of internet page record locators (URL 2, URL 2.1, and URL 2.2) define three separate pages for printing which have been derived from a single internet page, which is formally identified as "URL 2". The graphical user interface directory file 202 is modified to provide visual feedback to the user that a single internet page has been separated into two or more internet pages for printing. Next, in accordance with software block 232, the formatter program 204 of FIG. 3 is utilized to automatically extract all worldwide web titles, such as "HTML" titles, to recalculate the page numbers and to generate a table of contents 234. The graphical user interface directory file 202 is modified to include an identification 236 of the table of contents 234. Once this process has been repeated for all internet pages selected by the user, the data processing system 110 may print the hard copies of the internet pages in accordance with software block 238.

Figure 5:
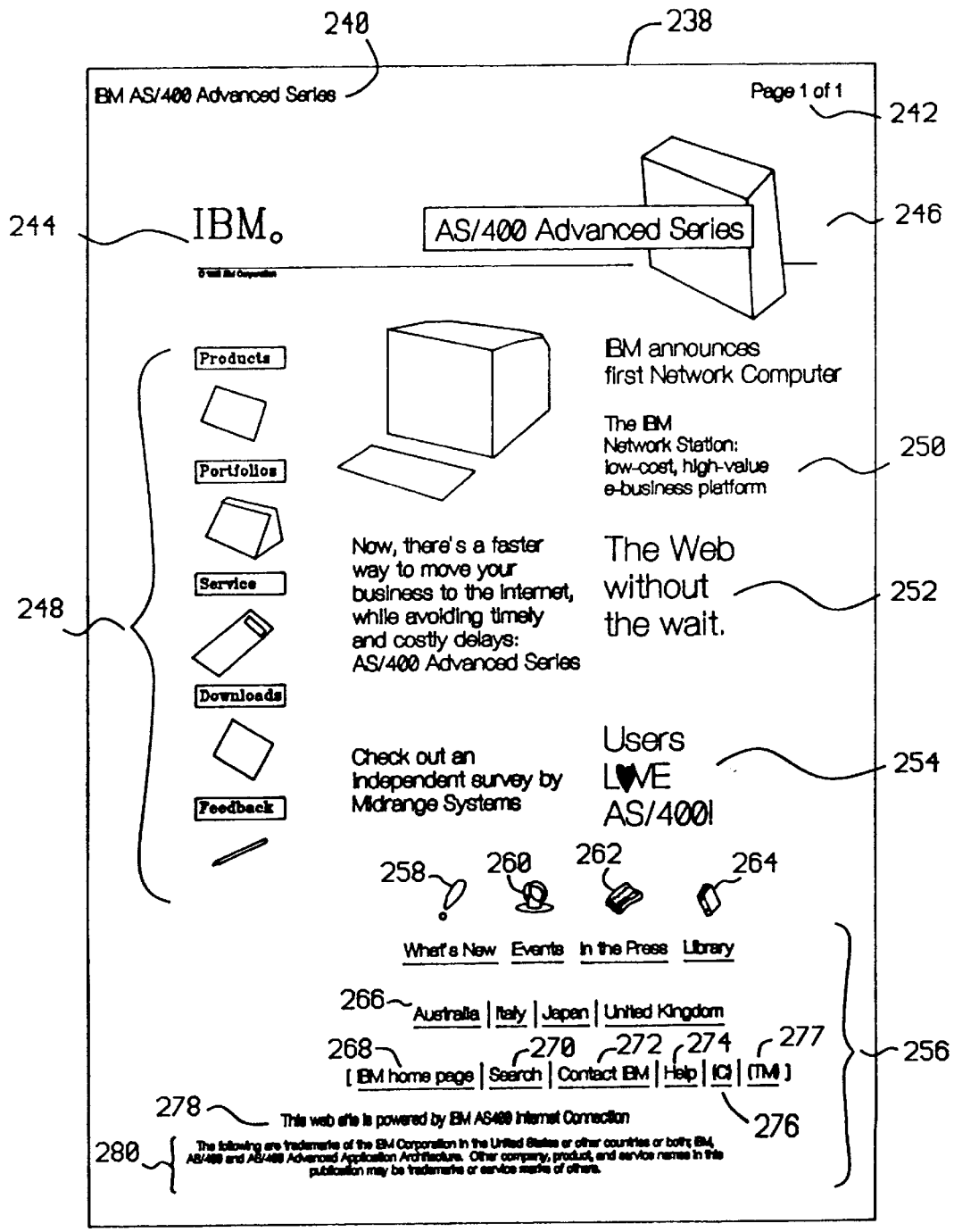
FIG. 5 is a pictorial representation of an exemplary worldwide web page.

FIG. 5 is a pictorial representation of an exemplary internet page 238. As is shown, a page title 240 is provided in the upper lefthand portion of internet page 238. Pagination information 242 is provided in the upper righthand portion of internet page 238. A graphical component 244 is provided which identifies the company associated with the internet page 238. A text and graphical component 246 is provided which identifies the content of the internet page 238. A plurality of subordinate graphical and text components 248 are provided in internet page 238. Some relatively standard text 250 is provided within internet page 238, as well as text 254 which includes some graphical components (such as the heart shape in the word "Love"). At the bottom of internet page 238, a variety of textual and graphical components are provided which constitute a visually perceptible internet link from internet page 238 to other related internet pages. A variety of icons 258, 260, 262, 264, are provided. A variety of text links 266, 268, 270, 272, 274, 276, 277, are also provided. Internet specific textual information 278 is provided within internet page 238. Standard legal disclaimers 280 are provided in internet page 238. The items at the lower portion of internet page 238 constitute internet page specific information 256 which need not be present on internet page 238 when it is in the form of printed material. In fact, such textual and iconographic components may be confusing and serve no purpose in printed text material. The operator may desire that this information be removed or modified in order to make the printed materials look professional.

In some instances, an internet page will include either or both of textual or graphical components which are introduced into the page by the internet browser software. In the exemplary page of FIG. 5, the page title 240 and the pagination information 242 are provided in internet page 238 by the browser software. In the preferred embodiment of the present invention, the operator should be provided with an option or election regarding browser-specific text or graphics. The operator is allowed to either "turn off" the browser-specific items or leave them in the printed page.

Figure 6A:
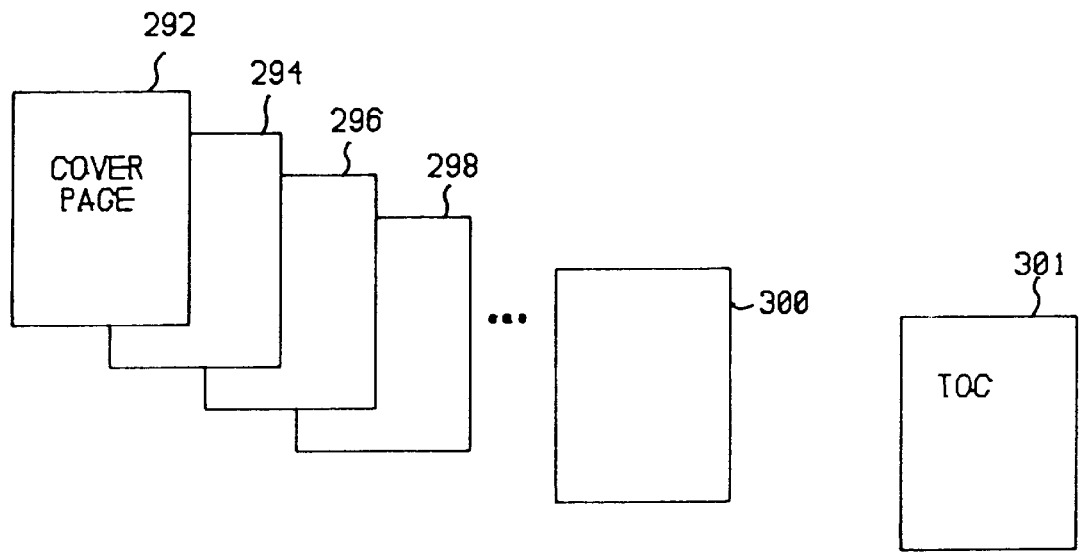
FIGS. 6A through 6E are pictorial representations of the exemplary types of some formatting operations which can be performed utilizing the present invention.
Figure 6B:
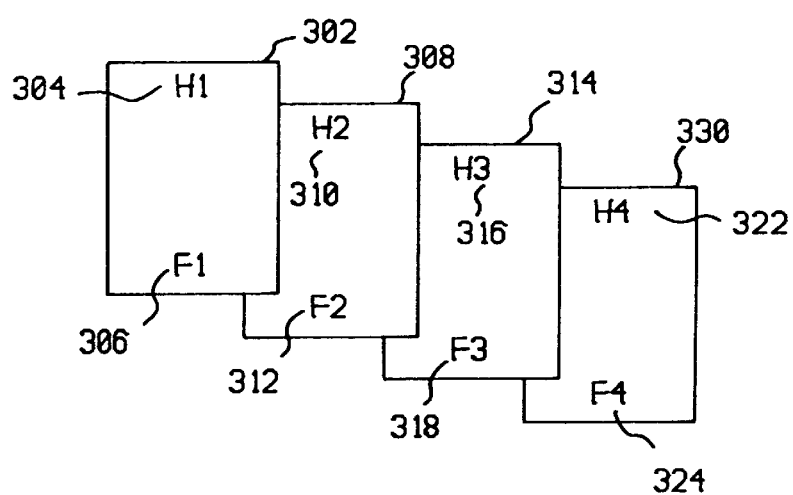
Figure 6C:
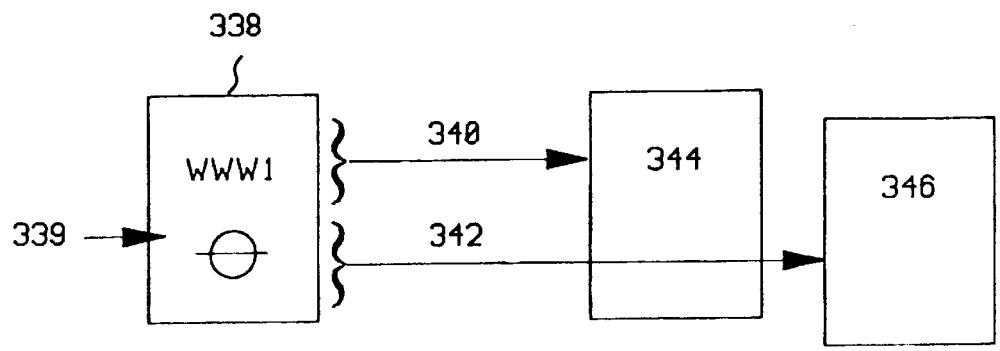
Figure 6D:
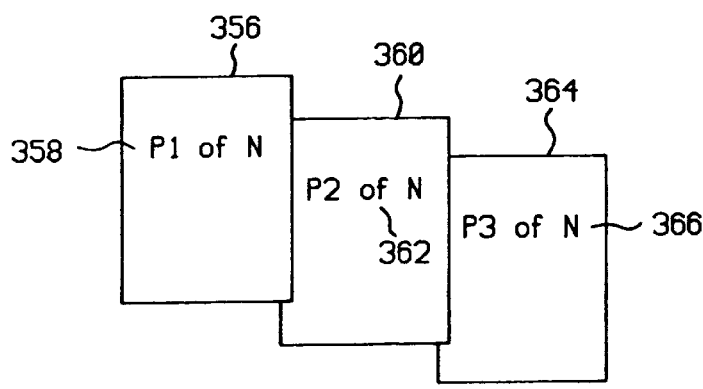
Figure 6E:
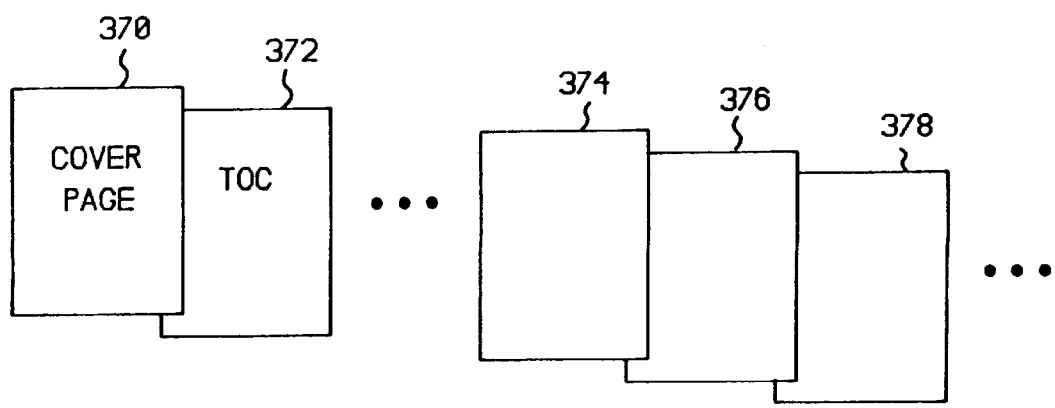

FIGS. 6A, 6B, 6C, 6D, and 6E are pictorial representations of some of the exemplary types of formatting operations and formatting requirements which may be determined by the operator, in accordance with the present invention. FIG. 6A depicts the generation of a cover page. As is shown, cover page 292 may be generated which is affiliated or associated with internet pages 294, 296, 298, and 300. A table of contents 301 may also be generated which is associated with the internet pages. As is depicted in FIG. 6B, internet pages may be printed with user-defined headers and footers. As is shown, internet page 203 will include user-defined header 304 and user-defined footer 306. Internet page 308 will include user-defined header 310 and user-defined footer 312. Internet page 314 will include user-defined header 316 and user-defined footer 318. Internet page 320 will include user-defined header 322 and user-defined footer 324. FIG. 6C graphically depicts the operator determination of content allocation among pages. As is shown, internet page 338 includes content 339 which may be separated into portions 340, 342, with each portion provided on a separate internet page 344, 346. In this manner, the operator may determine how the text and images are grouped and located on the printed pages. This will prevent the separation of text from image and a pagination which interrupts or breaks images into multiple components. FIG. 6D is a pictorial representation of the pagination operations. As is shown, internet page 356 is provided with pagination information 358. Internet page 360 is provided with pagination information 362. Internet page 364 is provided with pagination information 366. FIG. 6E is a pictorial representation of organization of the printed material in accordance with the present invention. As is shown, cover page 370 and table of contents 372 are provided and associated with internet pages 374, 376, 378. These printed materials may be utilized by the operator as informational, promotional, or sales material. One principal advantage of the present invention is that a group of sales or marketing personnel may be able to conduct business without carrying large quantities of printed materials about with them. The mobile personnel may utilize a portable computer and a printer to generate the particular informational, sales, or promotional materials at the customer's site or at a particular location before making sales, service, or other calls within a region. This allows an enormous amount of printed material to be available to the mobile personnel, in allowing the quick, trouble-free, and low-cost generation of printed materials in the field.

Figure 7A:
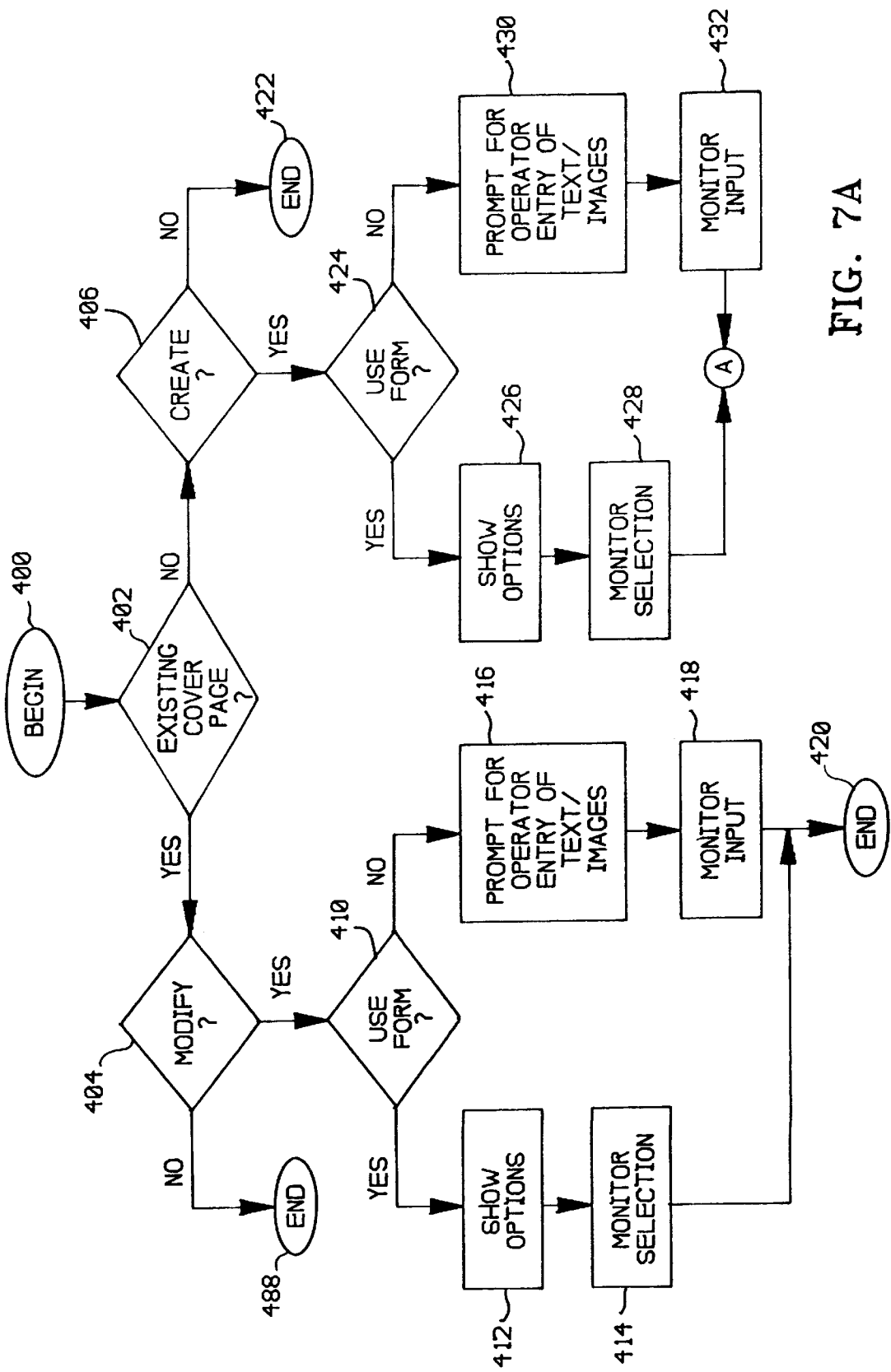
FIGS. 7A through 7D are flowchart representations of several formatting routines.
Figure 7B:
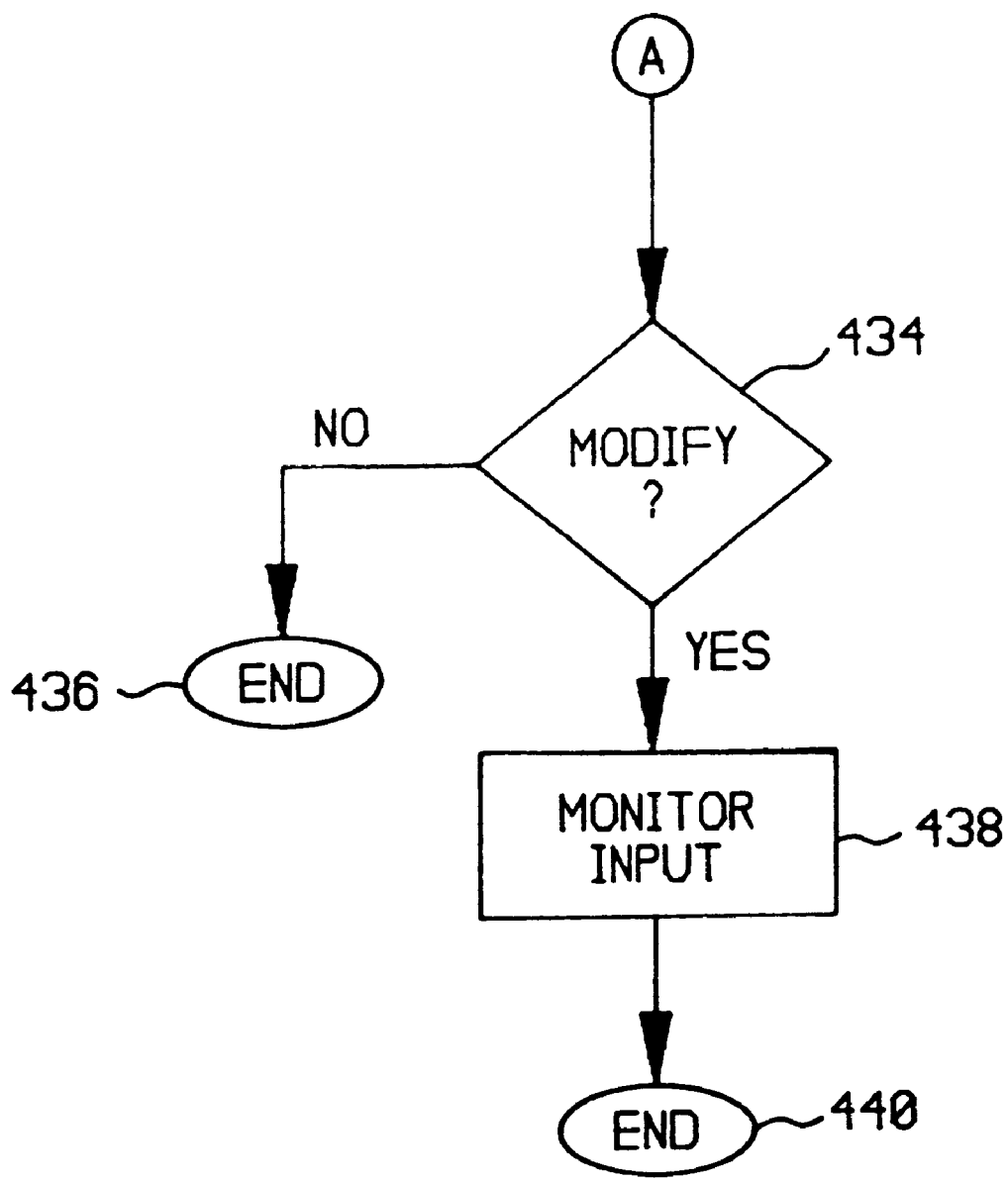
Figure 7C:
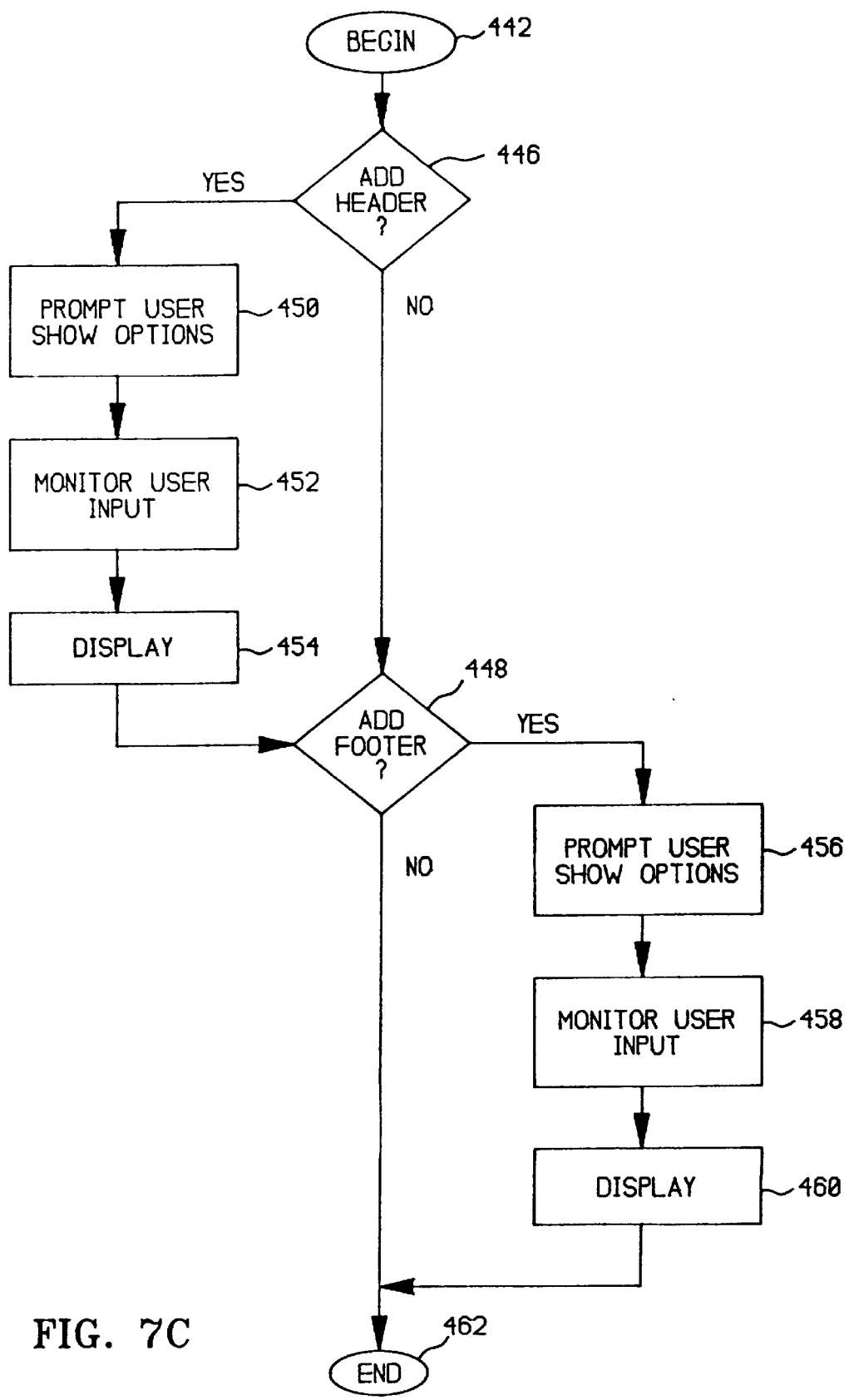
Figure 7D:
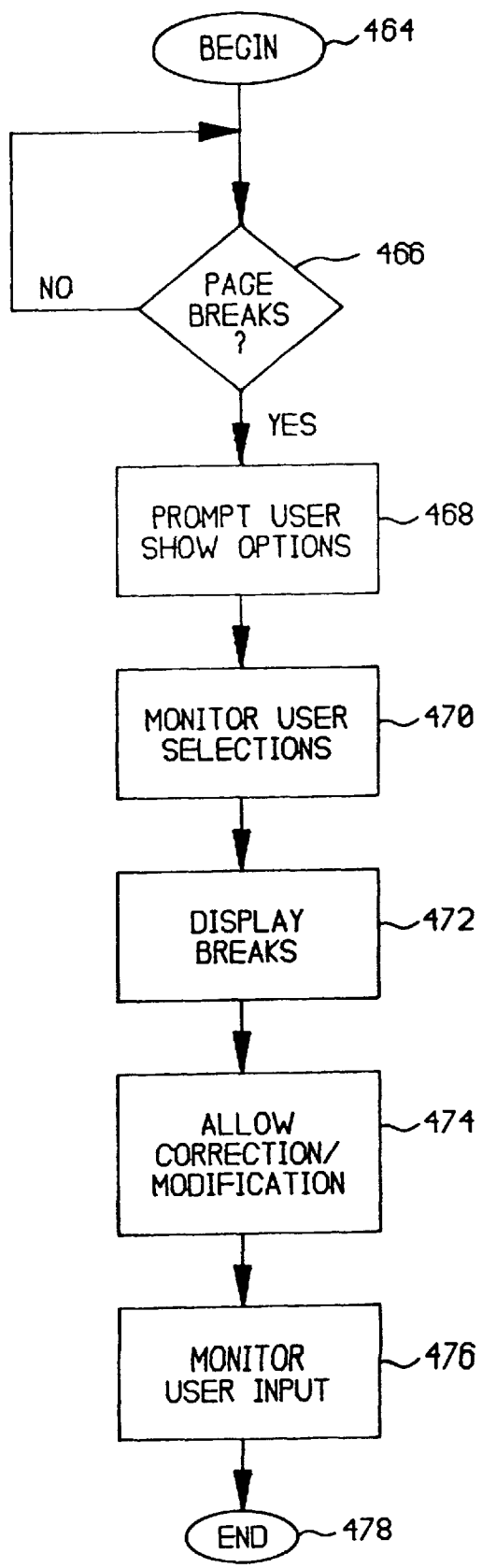

FIGS. 7A, 7B, 7C, and 7D depict in flowchart form some of the basic operations performed utilizing the present invention. FIG. 7A is a flowchart representation of the generation of a cover page. FIG. 7B is a flowchart representation of the generation of headers and footers. FIG. 7C is a flowchart representation of the determination of page breaks. Referring first to FIGS. 7A nad 7B the process begins at software block 400 and continues at software block 402, wherein data processing system 110 prompts the user to determine whether there is an existing cover page associated with a particular set of internet pages desired for printing; if not, control passes to software block 406; if so, control passes to software block 404. In accordance with software block 404, data processing system 110 determines whether the user will modify the existing cover sheet. If the existing cover sheet will not be modified, control passes to software block 408, where the process ends; if it is determined in software block 404 that the existing cover sheet will be modified, control passes to software block 410, wherein the data processing system 110 determines whether a form will be utilized for the modifications. If a form is utilized, control passes to software block 412, wherein the options are shown to the operator. Next, in accordance with software block 414, the data processing system 110 monitors for operator selection of an option. If, at software block 410, it is determined that the forms will not be utilized for modification of the existing cover sheet, control passes to software block 416, wherein the data processing system 110 prompts the operator for entry of text/images for the fields and textual regions provided in the form. Then, in accordance with software block 418, data processing system 110 monitors for operator input for the text/images which are to be added to the basic form. Then, the process ends at software block 420.

If it is determined in software block 402 that there is no existing cover page associated with the selected Internet pages, control passes to software block 406, where in the data processing system 110 it is determined whether a cover sheet will be created; if not, control passes to software block 422 where the process ends; if so, control passes to software block 424 wherein the user is prompted to determine whether the user will be utilizing forms that are available for the creation of a cover page. If it is determined in software 424 that a form will be utilized, control passes to software block 426, wherein data processing system 110 depicts the options available to the user. Then, control passes to software block 428 wherein data processing system 110 monitors for operation selection of the various options available for the creation of a form. If it is determined in software block 424 that the operator will not utilize a form, control passes to software block 430 wherein the data processing system 110 is utilized to prompt the operator for entry of text/images into a workspace. In accordance with software block 432, data processing system 110 monitors for operator input of text/images. Control then passes to software block 434, wherein data processing system 110 is utilized to depict to the operator the cover sheet which has been created. Then, the operator is provided an opportunity to modify or correct the cover sheet. If no modifications are desired, control passes to software block 436, wherein the process ends. If, however, modifications are desired, control passes to software block 438, wherein data processing system 110 monitors user input to determine what modifications, changes, or corrections need to be made to the cover sheet. Once those changes are entered, the process continues at software block 440, wherein the process ends.

A similar process is utilized for the creation of headers and footers for the internet pages which are to be printed. This is graphically depicted in FIG. 7C. The process begins at software block 442 and continues at software block 446, wherein data processing system 110 is utilized to determine whether the operator desires to add a header to a particular internet page; if so, control passes to software block 450, wherein data processing system 110 prompts the user to show options, monitors user options in accordance with software block 452, and displays the selected options in accordance with software block 454; if not, control passes to software block 448, wherein data processing system 110 is utilized to determine whether the operator desires to add any particular footers to the particular internet page. If it is determined by data processing system 110 that no footers are desired, control passes to software block 462, wherein the process ends. However, if it is determined that the operator desires to add footers to the internet page, control passes to software block 456, wherein the user is prompted to show the options that are available. Next, in accordance with software block 458, the data processing system 110 is utilized to monitor the user input to determine what options have been selected. Next, in accordance with software block 460, data processing system 110 displays the monitored user input and allows any necessary corrections. Finally, the process ends at software block 462.

FIG. 7C is a flowchart representation of the data processing implemented steps of determining page breaks in the internet pages selected by the operator for printing. The process begins at software block 464 and continues at software block 466, wherein data processing system 110 determines whether the operator desires to place page breaks within a selected internet page. If so, control passes to software block 468, wherein data processing system 110 prompts the user and shows the options that are available for page breaks. Then, in accordance with software block 470, data processing system 110 monitors the user selections to determine where the user desires to have page breaks within the internet page. As discussed above in detail, the user will not want to have page breaks which separate text and images which are appropriately grouped together on an internet page. Additionally, the operator will want to avoid page breaks which break or separate an image into separate pages, creating an unprofessional presentation. Next, in accordance with software block 472, data processing system 110 is utilized to display the page breaks that have been selected by the operator. Next, in accordance with software block 474, data processing system 110 prompts the user and allows correction and/or modification of the page breaks. The modifications entered by the operator are monitored in accordance with software block 476, and the process ends at software block 478.

In accordance with the present invention, the data processing implemented method and apparatus for formatting worldwide web pages can rely upon the printing utility which is part of the web browser software. Alternatively, the formatter program 204 of the present invention can carry its own printer utility instead of relying upon the browser software. Of course, the formatter program 204 could be included in any conventional or novel browser software which would increase and enhance the functionality of the browser software and make it more marketable.

What is claimed is:

1. A method for generating presentation-ready documents from web pages in accordance with operator-specified presentation instructions, said method comprising:

obtaining a list identifying one or more web pages containing a plurality of elements;

retrieving a copy of each identified web page;

obtaining presentation parameters specifying which of said plurality of elements are to be presented in a document and specifying a format in which said specified elements are to be presented; and in response to a first presentation request, producing a presentation-ready document in accordance with said presentation parameters.

2. A method according to claim 1, wherein at least one of said identified web pages includes at least one tag associated with an element among said plurality of elements to define a characteristic of said element according to a web page definition language, and wherein said step of producing said presentation-ready document comprises:

searching each retrieved copy for said at least one tag to identify all of said plurality of elements having said characteristic; and applying said presentation parameters to said identified elements to produce said presentation-ready document in accordance with said presentation parameters.

3. A method according to claim 2, wherein said presentation parameters identify at least one element as a web-specific element, and wherein said step of producing said presentation-ready document comprises:

copying said specified elements but not said web-specific element from said identified web pages to said presentation-ready document.

4. A method according to claim 2, wherein said at least one tag includes a title tag defining an element as a web page title, and wherein said step of producing said presentation-ready document comprises:

searching each retrieved copy for said title tag to identify said web page title; and producing a table of contents including said web page title.

5. A method according to claim 2, wherein:

said step of obtaining presentation parameters comprises receiving instructions identifying content for a leading page; and said step of producing said presentation-ready document comprises producing at least one presentation-ready leading page including said identified content.

6. A method according to claim 2, wherein said presentation-ready document comprises one or more hard-copy pages, each page having a main text area and a border area, and wherein said step of producing said presentation-ready document comprises:

printing specified information within said border area.

7. A method according to claim 6, wherein said border area includes a top margin and a bottom margin, and wherein said step of producing said presentation-ready document comprises:

printing pagination information in an operator-specified format within in at least one of said top margin and said bottom margin.

8. A method according to claim 2, wherein said presentation-ready document occupies two or more pages, and wherein said step of producing said presentation-ready document comprises:

presenting a first operator-specified portion of said plurality of elements together on a page of said presentation-ready document, and presenting a second operator-specified portion of said plurality of elements on one or more other pages of said presentation-ready document.

9. A method according to claim 2 further comprising:

saving said list and said presentation parameters; and thereafter, in response to a second presentation request received after an alteration to at least one of said plurality of elements:

automatically retrieving a current copy of each web page identified in said list;

automatically searching each current copy for said at least one tag to identify all of said plurality of elements having said characteristic; and automatically applying said presentation parameters to said identified elements to produce said presentation-ready document in accordance with said presentation parameters, despite said alteration.

10. A data processing system for generating presentation-ready documents from web pages in accordance with operator-specified presentation instructions, said data processing system comprising:

a processor and data storage in communication with said processor;

a web page formatter residing in said data storage and executable by said processor, said web page formatter including:

a source page selection mechanism for obtaining a list identifying one or more web pages containing a plurality of elements;

a web page retrieval mechanism for obtaining a copy of each identified web page;

a presentation parameter selection mechanism for obtaining presentation parameters from said operator, said presentation parameters specifying which of said plurality of elements are to be presented in a document and specifying a format in which said specified elements are to be presented; and a document producer for producing a presentation-ready document in accordance with said presentation parameters in response to a first presentation request.

11. A data processing system according to claim 10, wherein at least one of said identified web pages includes at least one tag associated with an element among said plurality of elements to define a characteristic of said element according to a web page definition language, and wherein said document producer comprises:

an element parser for searching each retrieved copy for said at least one tag to identify all of said plurality of elements having said characteristic; and a presentation formatter for applying said presentation parameters to said identified elements to produce said presentation-ready document in accordance with said presentation parameters.

12. A data processing system according to claim 11, wherein said presentation parameters identify at least one element as a web-specific element, and wherein said document producer comprises:

an element filter for copying said specified elements but not said web-specific element from said identified web pages to said presentation-ready document.

13. A data processing system according to claim 11, wherein said at least one tag includes a title tag defining an element as a web page title, and wherein said document producer comprises:

a title identifier for searching each retrieved copy for said title tag to identify said web page title; and a table-of-contents generator for producing a table of contents including said web page title.

14. A data processing system according to claim 11, wherein:

said presentation parameter selection mechanism includes means for identifying, obtaining, and storing leading page content; and said document producer includes a leading page generator for producing at least one presentation-ready leading page including said leading page content.

15. A data processing system according to claim 11, wherein said presentation-ready document comprises one or more hardcopy pages, each page having a main text area and a border area, and wherein said document producer comprises:

a header and footer generator for printing specified information within said border area.

16. A data processing system according to claim 15, wherein said border area includes a top margin and a bottom margin, and wherein said document producer comprises:

a page number generator for printing pagination information in an operator-specified format within in at least one of said top margin and said bottom margin.

17. A data processing system according to claim 11, wherein said presentation-ready document occupies two or more pages; and wherein said document producer comprises:

a page allocator for presenting a first operator-specified portion of said plurality of elements together on a page of said presentation-ready document and presenting a second operator-specified portion of said plurality of elements on one or more other pages of said presentation-ready document.

18. A data processing system according to claim 11, wherein said web page formatter stores said list in a web page directory, stores said presentation parameters in a parameter table, and includes reproductions means responsive to a second presentation request received after said first presentation request and after an alteration to at least one of said plurality of elements, said reproductions means including:

means for automatically causing said web page retrieval mechanism to obtain a current copy of each web page identified in said list in said web page directory;

means for automatically causing said element parser to search each current copy for said at least one tag to identify all of said plurality of elements having said characteristic; and means for automatically causing said document producer to apply said presentation parameters to said identified elements to produce a presentation-ready document in accordance with said presentation parameters, despite said alteration.

19. A program product for use with a data processing system, wherein the program product generates presentation-ready documents from web pages in accordance with operator-specified presentation instructions, said program product comprising:

a source page selection mechanism for obtaining a list from an operator, said list identifying one or more web pages containing a plurality of elements;

a web page retrieval mechanism for obtaining a copy of each web page in said list;

a presentation parameter selection mechanism for obtaining presentation parameters from said operator, said presentation parameters specifying which of said plurality of elements are to be presented in a document and specifying a format in which said specified elements are to be presented;

a document producer for producing a presentation-ready document in accordance with said presentation parameters in response to a first presentation request; and a computer usable medium encoding said source page selection mechanism, said web page retrieval mechanism, said presentation parameter selection mechanism, and said document producer.

20. A program product according to claim 19, wherein at least one of said identified web pages includes at least one tag associated with an element among said plurality of elements to define a characteristic of said element according to a web page definition language, and wherein said document producer comprises:

an element parser for searching each retrieved copy for said at least one tag to identify all of said plurality of elements having said characteristic; and a presentation formatter for applying said presentation parameters to said identified elements to produce said presentation-ready document in accordance with said presentation parameters.

21. A program product according to claim 20, wherein said presentation parameters identify at least one element as a web-specific element, and wherein said document producer comprises:

an element filter for copying said specified elements but not said web-specific element from said identified web pages to said presentation-ready document.

22. A program product according to claim 20, wherein said at least one tag includes a title tag defining an element as a web page title, and wherein said document producer comprises:

a title identifier for searching each retrieved copy for said title tag to identify said web page title; and a table-of-contents generator for producing a table of contents including said web page title.

23. A program product according to claim 20, wherein:

said presentation parameter selection mechanism includes means for identifying, obtaining, and storing leading page content; and said document producer includes a leading page generator for producing at least one presentation-ready leading page including said leading page content.

24. A program product according to claim 20, wherein said presentation-ready document comprises one or more hardcopy pages, each page having a main text area and a border area, and wherein said document producer comprises:

a header and footer generator for printing specified information within said border area.

25. A program product according to claim 24, wherein said border area includes a top margin and a bottom margin, and wherein said document producer comprises:

a page number generator for printing pagination information in an operator-specified format within in at least one of said top margin and said bottom margin.

26. A program product according to claim 20, wherein said presentation-ready document occupies two or more pages; and wherein said document producer comprises:

a page allocator for presenting a first operator-specified portion of said plurality of elements together on a page of said presentation-ready document and presenting a second operator-specified portion of said plurality of elements on one or more other pages of said presentation-ready document.

27. A program product according to claim 20, wherein said web page formatter stores said list in a web page directory, stores said presentation parameters in a parameter table, and includes reproduction means responsive to a second presentation request received after said first presentation request and after an alteration to at least one of said plurality of elements, said reproduction means including:

means for automatically causing said web page retrieval mechanism to obtain a current copy of each web page identified in said list in said web page directory;

means for automatically causing said element parser to search each current copy for said at least one tag to identify all of said plurality of elements having said characteristic; and means for automatically causing said document producer to apply said presentation parameters to said identified elements to produce a presentation-ready document in accordance with said presentation parameters, despite said alteration.

\* \* \* \* \*